UNITED STATES PATENT OFFICE.

LUDWIG BENDA, OF FRANKFORT-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

DINITROPHENYLARSINIC ACID.

1,075,538.     Specification of Letters Patent.     Patented Oct. 14, 1913.

No Drawing.     Application filed November 6, 1912. Serial No. 729,871.

*To all whom it may concern:*

Be it known that I, LUDWIG BENDA, Ph. D., chemist, a citizen of the Republic of Switzerland, residing at Frankfort-on-the-Main, Germany, have invented certain new and useful Improvements in Dinitrophenylarsinic Acid, of which the following is a specification.

I have found that by starting from diazotized dinitranilin

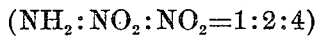

and treating the same with arsenious acid in presence of an excess of acid, the hitherto unknown dinitroarsinic acid of the constitution:

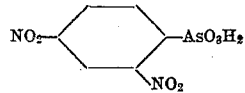

is obtained.

The process can be carried out in a very simple way namely by first diluting with ice the diazo compound, produced by diazotizing the dinitranilin by means of nitrosyl-sulfuric acid, dissolved in sulfuric acid, and then causing said diazo compound to react with arsenious acid.

The new dinitrophenylarsinic acid is of great value as parent material for the preparation of arseno compounds to be used for therapeutic purposes.

The following example illustrates my invention: 18.5 kg. of 1.2.4 dinitranilin are introduced, at a temperature below 25° C., while stirring, into a mixture of 30 kg. of monohydrate and 23 kg. of a nitrose (a solution of nitrous acid in sulfuric acid), containing 59 per cent. of nitrosyl sulfuric acid, and the brown solution thus obtained is diluted by adding 250 kg. of ice, whereupon a solution of 25 kg. of sodium arsenite in 50 liters of water is quickly run, while stirring, into this solution. The reaction occurs at ordinary temperature with intumescence, and in order to complete it, the mass may be gently heated. As soon as the diazo reaction has almost disappeared, a small quantity of animal charcoal is added and the mass is filtered while hot. On addition of common salt, the new compound precipitates from the slightly-colored filtrate in the form of crystals.

The new compound forms needles, very readily soluble in hot water, readily soluble in cold water; it is very readily soluble in alkalis, sodium carbonate and acetate, glacial acetic acid, methyl alcohol and ethyl alcohol, but is insoluble in ether. Its aqueous solution colors congo-paper violet, and it melts at 199–200° C.

Having now described my invention, what I claim is:

As a new product, the dinitrophenylarsinic acid containing the atom groups $NO_2$, $NO_2$, and $AsO_3H_2$ in 1:3:4 position forming needles which are readily soluble in water and alcohol, said acid being readily soluble in alkalis and sodium acetate and melting at 199–200° C.

In testimony whereof, I affix my signature in presence of two witnesses.

LUDWIG BENDA.

Witnesses:
    JEAN GRUND,
    CARL GRUND.